Sept. 20, 1971   N. B. OBERG ETAL   3,606,275
PADDLE ASSEMBLY FOR BULK MILK TANKS
Filed May 6, 1969

Inventors
NATHAN B. OBERG
BERNARD H. HEIMANN
HUGO W. HOLTMEIER

By Cohn and Powell
Attorneys

United States Patent Office 3,606,275
Patented Sept. 20, 1971

3,606,275
PADDLE ASSEMBLY FOR BULK MILK TANKS
Nathan B. Oberg, Bernard H. Heimann, and Hugo W. Holtmeier, Washington, Mo., assignors to Zero Manufacturing Company, Washington, Mo.
Filed May 6, 1969, Ser. No. 822,250
Int. Cl. B01f 7/16
U.S. Cl. 259—107    4 Claims

ABSTRACT OF THE DISCLOSURE

This cooling and cleaning system provides a paddle assembly performing both the cleaning and cooling functions in a bulk milk tank. The paddle assembly includes a shaft depending from a variable speed, reversible drive means. Upper and lower paddles are provided at the remote end of the shaft to provide the circulating action at a relatively slow rotational speed during the cooling cycle. The lower paddle includes spatter blades immersible in a cleaning fluid when the tank is empty of milk, the spatter blades benig rotatable at a relatively high speed in a reverse direction during the cleaning cycle.

BACKGROUND OF THE INVENTION

This invention relates in general to a cooling and cleaning system for bulk milk tanks, and in particular to an improved paddle assembly for use in such a system.

The practice of cooling milk in bulk containers has many advantages to recommend it. Odors are removed, flavor is improved and the bacteria count is dropped.

There is an obvious saving in manhours employed in performing the task of cleaning the bulk milk tanks when such cleaning is performed automatically. Consequently, automatic systems have been developed to cool the milk and also to rinse the interior of the tanks with cleaning fluid periodically to insure that no contaminants are permitted to exist within the tank and to maintain the interior surfaces in a hygienic condition.

One of the most efficient means of achieving optimum cleaning of milk in bulk containers is to agitate the milk by stirring at a relatively slow rate, and paddle assemblies of various designs have been used for this purpose. In cleaning the tank interiors, paddles of a scoop design have been used in the past to effectuate spray cleaning. Combination assemblies, having one paddle designed to accomplish stirring action and another to effectuate cleaning exist, but the efficiency of such assemblies is impaired by having independent paddles provide the stirring action and the cleaning action respectively.

SUMMARY OF THE INVENTION

The improved paddle assembly of this cooling and cleaning system provides upper and lower paddles which include stirring blade portions adapted to facilitate efficient cooling of the milk during the cleaning cycle. The lower paddle includes, in addition, spatter-spray cleaning blades which are immersed in cleaning fluid and operate during the cleaning cycle. During this period, the stirring blades are substantially clear of the cleaning fluid to reduce torsion on the shaft.

The drive means is reversible during the cleaning cycle to achieve optimum efficiency of the spatter blades of the lower paddle when the spatter blades only are immersed in the cleaning fluid and the shaft is rotated at a relatively high speed.

The paddle assembly includes a vertical shaft attached at one end to a variable speed drive motor which rotates the shaft at a stirring rate during the cooling cycle and a spraying rate during the cleaning cycle. The shaft carries upper and lower paddle means at its remote end which are rotatable with the shaft.

The upper paddle means includes stirring blades disposed in twisted relation to the shaft, the stirring blades introducing vertical circulating movement into the bulk milk during the cooling cycle.

The lower paddle means also includes stirring blades disposed in twisted relation to the shaft, the stirring blades inducing vertical circulating movement into the milk during the cooling cycle and, in addition, includes spatter blades disposed below the stirring blades, the spatter blades being immersible in a shallow depth of cleaning fluid to spray the cleaning fluid upwardly and outwardly during the cleaning cycle. The variable speed drive motor is reversible. During the cooling cycle, the blades of the upper and lower paddle means are rotated at a selected speed and in a selected direction of rotation; during the cleaning cycle, the blades of the upepr and lower paddle means are rotated at a greater speed and in a reversible direction.

The spatter blades depend from and are integral with associated stirring blades of the second paddle means. The spatter blades are oriented in a direction to augment vertical circulating movement into the bulk milk during the cooling cycle. The attached end of each spatter blade is disposed in spaced relation from the shaft, and each spatter blade extends outwardly from its associated stirrer blade.

The stirring blades of the second paddle means are canted upwardly at their remote end to facilitate clearance of the stirring blades from the surface of the cleaning fluid to minimize drag during the cleaning cycle.

The upper paddle means includes a pair of aligned blades extending transversely from the shaft, substantially at right angles to similarly aligned blades of the lower paddle means in the plane of rotation of the shaft.

DESCRIPTION OF THE PREFERRED EMBODIMENT

Figure 1:
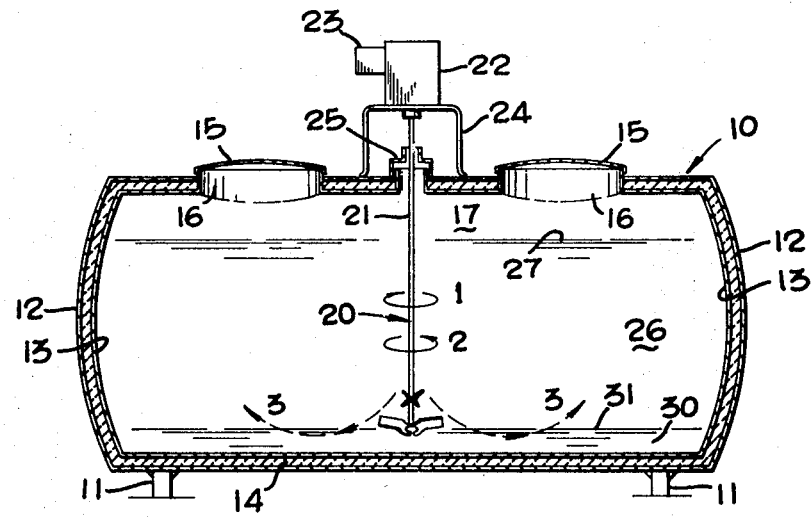
FIG. 1 is a cross sectional elevational view taken through the longitudinal axis of the bulk milk tank, illustrating the disposition of the paddle assembly.

Referring now by characters of reference to the drawing and first to FIG. 1, it will be understood that the bulk milk tank generally shown by numeral 10 is substantially cylindrical in shape and is supported on a plurality of feet 11. The tank 10 includes inner and outer walls 12 and 13 having insulating material 14 therebetween. A pair of covers 15 facilitate the entry of vacuum and milk lines (not shown) into the interior of the tank 10 by way of apertures 16.

A paddle assembly generally shown by numeral 20 is suspended within the tank 10. This paddle assembly 20 includes a shaft 21, attached in rotative relation to an electric motor 22 which constitutes a variable speed drive means and includes a reversing switch 23. The motor 22 is supported on a frame 24, the frame being disposed in seated relation on the upper portion of the outer wall 12. A journal means 25 is provided, which receives the shaft 21 in rotative relation within the interior 17 of the bulk tank 10 and facilitates stable rotation of the shaft 21.

During the cooling cycle, the tank 10 contains a quantity of bulk milk 26 up to a level indicated by numeral 27. During the cleaning cycle, at which time the milk has been emptied from the tank 10, the tank 10 contains a quantity of cleaning fluid 30 up to a level indicated by numeral 31.

Figure 2:
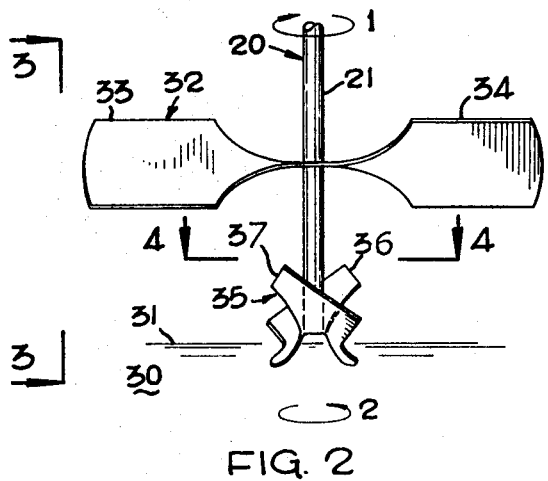
FIG. 2 is an enlarged elevational view of the upper paddle and an end view of the lower paddle.
Figure 3:
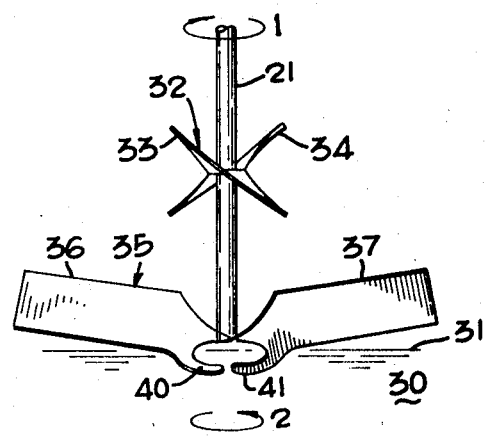
FIG. 3 is a view of the paddle assembly as taken on line 3—3 of FIG. 2.
Figure 4:
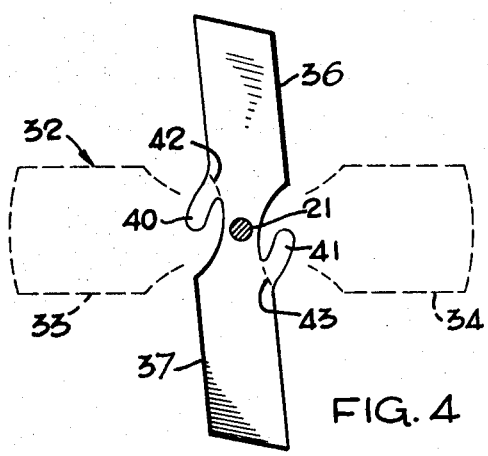
FIG. 4 is a plan view of the lower paddle taken on line 4—4 of FIG. 2, the upper paddle being shown in fragmentary, broken outline.

Referring now to FIGS. 2, 3, and 4, it will be understood that the paddle assembly 20 includes a propeller-like paddle 32, constituting a first rotating paddle means. The paddle 32 includes a pair of opposed stirring blades 33 and 34, and these blades 33 and 34 are disposed in twisted relation to each other, as may clearly be seen from FIG. 3. The blades 33 and 34 are thus inclined relative to the shaft 21.

The paddle assembly also includes a second propeller-like paddle 35, constituting a second paddle means. The paddle 35 includes a pair of opposed stirring blades 36 and 37, which are disposed in twisted relation with each other as shown in FIG. 2, and which are, in addition, canted upwardly at their remote ends as shown in FIG. 3.

Each of the paddle blades 36 and 37 has a spatter blade 40 and 41 respectively attached to an associated paddle blade. In the preferred embodiment, the spatter blades 40 and 41 assume the form of a depending finger integral with the stirring blades 36 and 37. The attachment of each spatter blade to its associated stirrer blade is preferably at a point spaced from the axis of rotation of the shaft 21. As shown in FIG. 4, the spatter blades project outwardly from associated stirrer blades, and the remote end of each spatter blade 40 and 41 describes a smaller rotational circle than its associated stirrer blade 36 and 37.

It is though that the structural features of this paddle assembly have become fully apparent from the foregoing description of parts. For completeness of disclosure, the operation of this paddle assembly will be described.

During the cooling cycle, with milk at a depth indicated by numeral 27, the shaft 21, as shown in FIG. 1, rotates at a speed of some 36 r.p.m. At this speed, the upper stirrer blades 33 and 34 and the lower stirrer blades 36 and 37, rotate sufficiently rapidly to cause an initially downward but circulating movement of the milk to facilitate the cooling of the milk. This downward movement is induced by the pitch of the blades which, combined with the direction of rotation as indicated by arrow 1 (FIG. 1) pushes the milk downwardly when the rotation is clockwise. This can be seen by reference to FIG. 3. When movement is clockwise rotational, the blade 33 moves to the left and the blade 34 moves to the right. Because of the inclination of these blades 33 and 34, a downward force is exerted on the liquid. The same is true as seen in FIG. 2 with regard to the blade 36 which moves to the left and the blade 37 which moves to the right.

The spatter blades 40 and 41, which are inclined in the same general direction as their associated stirrer blades 36 and 37 respectively, tend to augment this stirring action to some extent. The spatter blades 40 and 41 are conveniently formed integrally with the stirrer blades 36 and 37 respectively and the remote ends of the spatter blades 40 and 41 extend inwardly and downwardly relative to the remote ends of the stirrer blades 36 and 37, as clearly indicated in FIGS. 2 and 3. In order to achieve greater immersion in the cleaning fluid, the spatter blades are bent downwardly out of the plane of the stirrer blades at the point of attachment thereto. Numerals 42 and 43 in FIG. 4 indicate suggested bend lines.

When it is desired to clean the interior of the tank 10, the milk is completely emptied therefrom and cleaning fluid 30 such as water with an added detergent, is allowed to enter the interior 17 of the tank 10 at a depth corresponding to the level indicated by numeral 31. It will be understood that at this depth, the spatter portions 40 and 41 of the lower paddle means 35 are substantially immersed in the cleaning fluid 30. The stirrer blades 36 and 37, on the other hand, because they are canted, are clear of the surface 31 of the cleaning fluid 30.

Because of the relatively small surface area of the spatter blades 40 and 41, the shaft may be rotated at a considerably increased angular speed of some 300 r.p.m. and, when the switching means 23 is actuated to reverse the direction of the motor 22, and therefore of the shaft 21, the pitch of the blades 40 and 41 tends to push the cleaning fluid in an upward direction. The finger-like shape of the depending spatter blades 40 and 41, combined with the relatively high speed of these blades, causes the water to spatter in a spray to all parts of the interior of the tank, thereby effectively cleaning the tank with optimum efficiency. Further, because of the canting of the lower stirrer blades 36 and 37, they are clear of the cleaning fluid 30 and, therefore, do not present a drag surface which would tend to slow their motion. These blades 36 and 37, as well as blades 33 and 34, do tend advantageously to present a flywheel effect providing uniformity of motion and smooth acting of the paddle assembly as a whole.

We claim:
1. In a cooling and cleaning system for bulk milk tanks, and the like; of the type in which the milk is cooled in bulk by stirring during a cooling cycle, and in which the tank is cleaned by agitation of cleaning fluid during a cleaning cycle; a rotary paddle assembly for effectuating both cooling and cleaning, the paddle assembly comprising:
 (a) a tank containing milk at one level during the cooling cycle and cleaning fluid at a lower level during the mixing cycle,
 (b) a shaft extending into the tank.
 (c) variable speed drive means rotating the shaft at one speed during the cooling cycle and at a higher speed during the cleaning cycle,
 (d) a first rotating paddle means carried by the shaft above the level of the cleaning fluid and including a stirring blade angularly related to the shaft and having a remote end, the stirring blade inducing vertical circulating movement into the bulk milk during the cooling cycle, and
 (e) a second rotating paddle means carried by the shaft below the first paddle means, the second paddle means including:
  (1) a stirring blade angularly related to the shaft and having a remote end, the stirring blade of the second paddle means inducing vertical circulating movement into the bulk milk during the cooling cycle, and
  (2) a spatter blade depending from and integral with the stirring blade of the second paddle means, the spatter blade having a remote end substantially oppositely disposed of the remote end of said stirring blade, and immersible in a shallow depth of cleaning fluid to spray the cleaning fluid upwardly and outwardly.
2. A cooling and cleaning system as defined in claim 1, in which:
 (f) the stirring blade of the second paddle means is canted upwardly at its remote end to a level above the level of the cleaning fluid to facilitate clearance of the blade from the surface of the cleaning fluid during the cleaning cycle.
3. In a cooling and cleaning system for bulk milk tanks and the like; of the type in which the milk is cooled in bulk by stirring during a cooling cycle and the tank is cleaned by agitation of cleaning fluid during a cleaning cycle; a rotary paddle assembly effectuating both cooling and cleaning, the paddle assembly comprising:
 (a) a tank including a bottom wall and containing milk at one level during the cooling cycle and cleaning fluid at a lower level during the mixing cycle,
 (b) a shaft extending into the tank and including a remote end and spaced from said bottom wall,
 (c) variable speed drive means rotating the shaft at one speed during the cooling cycle and at a higher speed during the cleaning cycle, (d) a first rotating paddle means carried by the shaft above the level of the cleaning fluid and including a pair of oppositely extending stirring blades disposed in twisted relation to each other, each blade having a remote end, the inclination of the blades inducing vertical circulating movement into the bulk milk during the cooling cycle, and (e) a second rotating paddle means, said second paddle means including:

(1) a pair of oppositely extending stirring blades disposed in twisted relation to each other, each blade having a remote end, the inclination of the blades of the second paddle means inducing vertical circulating movement into the bulk milk during the cooling cycle, said blades being disposed, at least in part, above the level of the cleaning fluid during the cleaning cycle, and (2) a pair of spatter blades, each of the spatter blades being integral with and depending downwardly from an associated stirring blade of the second paddle means, each spatter blade having a remote end and immersible in a shallow depth of cleaning fluid to spray the cleaning fluid upwardly and outwardly.

4. A cooling and cleaning system as defined in claim 3, in which:

(f) the stirring blades of the first and second paddle means are oriented to induce downward circulating movement in the bulk milk, (g) the spatter blades are oriented to augment the circulating action of stirring blades during the cooling cycle, and (h) the variable speed drive means is reversible so that the cleaning fluid is sprayed upwardly during the cleaning cycle.

References Cited

UNITED STATES PATENTS

| 3,147,958 | 9/1964 | Stiffler | 259—107 |
| 2,799,485 | 7/1957 | Silverman | 259—107X |

JORDAN FRANKLIN, Primary Examiner

G. V. LARKIN, Assistant Examiner